United States Patent

Hashimoto

[15] 3,647,206
[45] Mar. 7, 1972

[54] MEANS FOR DETECTING SLIPPAGE OR STOPPAGE OF ENDLESS BELT IN COPYING MACHINE

[72] Inventor: Hideo Hashimoto, Koshigaya, Japan
[73] Assignee: Ricoh Co., Ltd., Tokyo, Japan
[22] Filed: Aug. 3, 1970
[21] Appl. No.: 60,567

[30] Foreign Application Priority Data

Aug. 14, 1969 Japan....................................44/63865

[52] U.S. Cl..................................271/57, 355/104, 355/69
[51] Int. Cl........................................................B65h 7/00
[58] Field of Search....................355/97, 104, 3, 6, 8, 14, 69; 198/232; 271/57

[56] References Cited

UNITED STATES PATENTS 2,997,297   8/1961   Fox..........................................271/57

Primary Examiner—Samuel S. Matthews
Assistant Examiner—Richard M. Sheer
Attorney—Henry T. Burke, Robert Scobey, Robert S. Dunham, P. E. Henninger, Lester W. Clark, Gerald W. Griffin, Thomas F. Moran, R. Bradlee Boal and Christopher C. Dunham

[57] ABSTRACT

In a copying machine of the type having an endless belt on guide rollers for feeding copy sheets about a transparent printing cylinder, a system at one of the belt-driven guide rollers for detecting the slippage or stoppage of the endless belt, which system comprises a motor having an output shaft with a given rate of rotation which is lower than the rotation rate of the guide roller during normal operation, and two juxtaposed cam plates, one connected through a one-way clutch to the shaft of the guide roller and the other connected through a one-way clutch to the output shaft. The two plates are coupled for rotation together by a pin which projects from one into an arcuate slot in the other. When the roller is turning faster than the motor shaft, the roller clutch engages, causing the two cam plates to be driven in unison at the roller rotation rate by engagement of the pin with one end of the slot while the output shaft clutch is disengaged. If the rotation rate of the guide roller drops below that of the output shaft, relative rotation between the plates causes the pin to engage the opposite end of the slot, thereupon causing the output shaft clutch to engage to drive the plate system, while the roller clutch disengages. The periphery of each cam plate is provided with a recess, which recesses are out of register when the cam plate system is being driven through the guide roller clutch, but which are brought into register by the shifting of the pin in the slot when the output shaft clutch takes over the driving operation. A switch is provided having an actuator, riding on the outer periphery of the rotating cam plate, which drops into the recesses when indexed, giving a signal that indicates the slippage or stoppage of the belt on the roller and which can be used to operate associate components in the machine to deal with the condition.

10 Claims, 4 Drawing Figures

INVENTOR.
HIDEO HASHIMOTO
BY
Henry J. Burke
ATTORNEY

MEANS FOR DETECTING SLIPPAGE OR STOPPAGE OF ENDLESS BELT IN COPYING MACHINE

BACKGROUND OF THE INVENTION

This invention relates to copying machines of the type having a printing light source with an endless belt for feeding copy sheets and more particularly to means for detecting the stoppage of the feed belt.

It often happens that the movement of the endless belt is inadvertently stopped during the operation of a copying machine of the type indicated above. When such an accident happens, a portion of the endless belt may be exposed to the radiant heat from the light source, such as a mercury lamp, for example, over a prolonged period of time. Should a copy sheet of low combustion point be disposed in this position, there is the danger of a fire breaking out. Various factors may account for the inadvertent stopping of the movement of the endless belt among which are:

1. Failure of the drive motor;
2. Failure of the power transmission system from the drive motor to the belt drive roller; and
3. Slip between the drive roller and endless belt caused by an excess torque produced by damage to the transparent printing cylinder or contamination of the belt by foreign matter during the operation of the belt.

Of the factors mentioned above, damage to the printing cylinder is the most serious occurrence. In such event, the mercury lamp and the endless belt may be brought into direct contact with each other and the belt may immediately be burned because the surface of the mercury lamp has a temperature ranging from 300° to 400° C.

The present invention provides means in a copying machine of the type described by which the aforementioned danger can be prevented without fail.

SUMMARY OF THE INVENTION

Accordingly the present invention comprises means for detecting nonrotation of one of the guide rollers on which the endless belt is mounted, which detection means includes an electric motor having an output shaft whose number of revolutions is smaller than the minimum number of revolutions of the guide roller in which the detection means is provided, so that the detection means produces and endless belt slippage or stoppage signal when the number of revolutions of the guide roller is reduced below the number of revolutions of the electric motor. This invention ensures that the nonrotation of the guide roller for the belt and hence stoppage of the endless belt is positively detected.

The endless belt nontravel detection means according to this invention advantageously includes two cam plates juxtaposed with EACH other, one of the cam plates being attached, through a one-way clutch, to one end of the shaft of the guide roller on which the detection means is mounted and the other cam plate being attached, through another one-way clutch, to an each end of the shaft of the motor. The two cam plates are disposed in a nondetection relative position in normal operation when the number of revolutions of the guide roller is higher than the number of revolutions of the motor and they are brought to a detection relative position when the number of revolutions of the guide roller is reduced below the number of revolutions of the motor, whereupon a detection signal is produced.

Advantageously, the supply of power to the belt drive section and the light source section of the machine is shut off by control means when the endless belt nontravel detection signal is produced while the supply of power to the cooling section is maintained.

Additional features and advantages of this invention will become evident from the description set forth hereinafter when considered in conjunction with the accompanying drawings.

DETAILED DESCRIPTION OF THE PREFERRED EMBODIMENT

Figure 1:
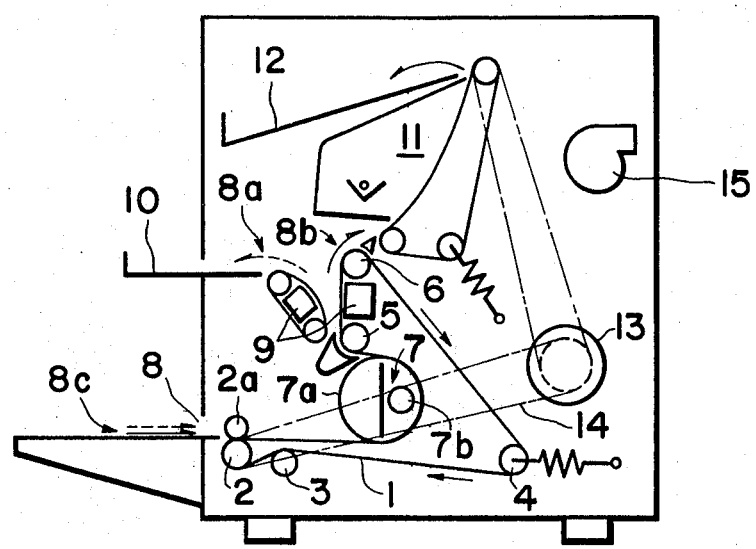
FIG. 1 is a diagrammatic view illustrating an ammonia process diazo copying machine to which the present invention is applicable.

The copying machine shown in FIG. 1 is of the ammonia process diazo type wherein an endless belt 1 is entrained about a drive roller 2, guide rollers 3, 4, 5 and 6, and a transparent printing cylinder 7a which is part of a light source section 7. A master sheet 8a superposed on a photosensitive sheet 8b to form a master-photosensitive sheet assembly 8c is introduced into the machine through an inlet port 8. The assembly 8c is held between the drive roller 2 and a follower roller 2a, disposed opposite the drive roller with respect to the run of endless belt 1, and moved forwardly till it reaches the light source section 7 where it is held between the endless belt 1 and the transparent printing cylinder 7a of the light source section 7. At this time, the master-photosensitive sheet assembly 8c is exposed to the light source 7b. The assembly 8c is then moved further forwardly to a suction separation section 9 where the photosensitive sheet is separated from the master sheet, the master sheet 8a is moved to a master sheet receiving tray 10 and the photosensitive sheet 8b is further moved through an ammonia-developing section 11 and finally reaches a copy sheet receiving tray 12. The drive roller 2 is driven by a drive motor 13 through a chain 14. 15 designates a cooling fan.

The endless belt 1 may consist of a plurality of belts arranged in side by side relation and spaced apart equidistantly from one another. It will be seen that if the endless belt 1 stops in its travel, the guide rollers 3, 4, 5 and 6 will accordingly stop rotating.

Figure 2:
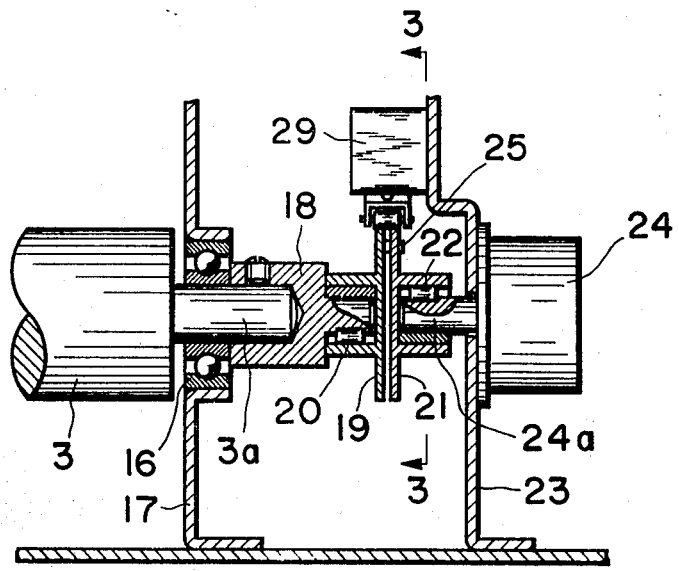
FIG. 2 is sectional view of the endless belt slippage or stoppage detection means constructed according to this invention.
Figure 3:
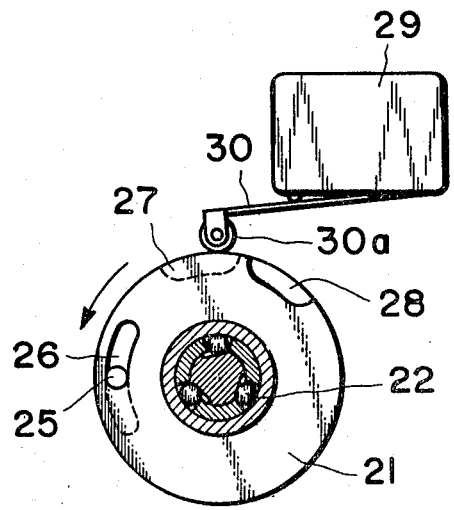
FIG. 3 is a view taken along the lines 3—3 in FIG. 2 illustrating the relative positions of two cam plates.

In FIG. 2, an end 3a of the shaft of the guide roller 3 is journaled in a bearing 16 mounted on one sideplate 17 of the machine. Mounted on the end 3a of the shaft extending outwardly through the sideplate 17 is a coupling 18 to which is connected a first cam plate 19 at its end through a one-way clutch or freewheeling clutch 20. Juxtaposed with the first cam plate 19 is a second cam plate 21 which is carried by a one-way clutch 22 connected to the shaft 24a of an alternating current motor 24 of low-rotation rate mounted on a motor support plate 23. The number of revolutions of the output shaft 24a of the alternating current motor 24 is selected such that it is lower than the number of revolutions of the guide roller 3 when the copying machine is operated at the lowest speed. Secured to the surface of the first cam plate 19 is a pin 25 projecting toward the second cam plate 21 which is provided with an arcuate slot 26 as shown in FIG. 3 for receiving therein the forward end portion of the pin 25. The first cam plate 19 and second cam plate 21 are formed at their outer peripheries with recesses 27 and 28 respectively which are of identical shape. The relative positions of the recesses 27 and 28, and the pin 25 and slot 26 are such that if the two cam plates 19 and 21 rotate in the direction of the arrow and the pin 25 and slot 26 are both in the solid line positions as in FIG. 3, the recesses 27 and 28 formed on the outer peripheries of the two cam plates do not register with each other and are displaced from each other as shown in FIG. 3. If the slot 26 is in the broken line position and the pin is in the solid line position, the recesses 27 and 28 are indexed with each other so that one recess overlies the other. A microswitch 29, which includes an actuator 30 mounting at its forward end a roller 30a, is maintained in sliding contact with the outer peripheral surfaces of the two cam plates 19 and 21. The roller 30a is adapted to drop into the recesses 27 and 28 when the two recesses are superposed one over the other. It will, of course, be understood that the pin 25 may alternately be secured to the outer surface of the cam plate 21 and the slot 26 may be formed in the cam plate 19.

Figure 4:
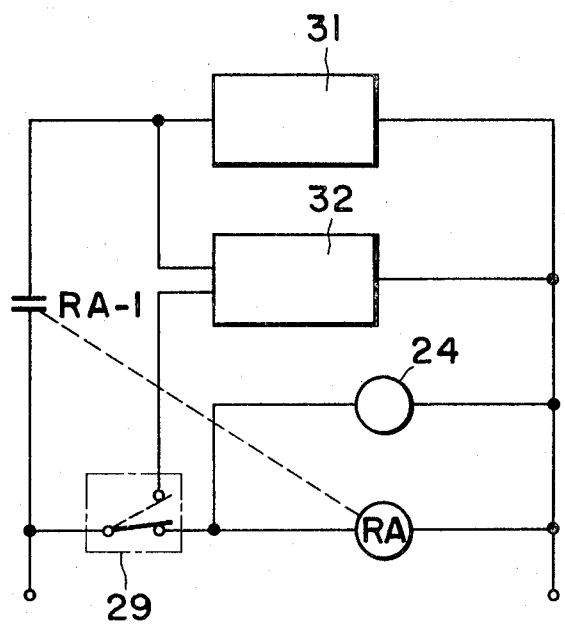
FIG. 4 is a block diagram of an electric circuit used in this invention.

In FIG. 4, 31 designates a circuit for supplying power to the light source section 7 and the drive motor 13, and 32 designates a circuit for supplying power to the cooling fan 15. The microswitch 29 normally closes a parallel circuit, containing a relay RA and the alternating current motor 24 of low rate of rotation, but opens the parallel circuit and closes the circuit 32 when the actuator roller 30a drops into the indexed recesses 27 and 28. The relay RA has a relay contact RA-1 which is closed when the relay is energized and opened when the relay is deenergized.

The operation of the device will now be explained with reference to FIGS. 2 to 4. In normal operation, the coupling 18 connected to one end 3a of the shaft of the guide roller 3 rotates together with the roller 3 thus rendering the one-way clutch 20 operative so that the first cam plate 19 may rotate with the roller 3 as a unit. Since the number of revolutions of the guide roller 3 is higher than the number of revolutions of the alternating current motor 24, the pin 25 secured to the first cam plate 19 and the slot 26 formed in the second cam plate 21 will be disposed in the relative positions shown in solid lines in FIG. 3. The second cam plate 21 rotates in the direction of the arrow together with the first cam plate 19 in slaved relation while sliding relative to the shaft 24a of the alternating current motor 24 through the one-way clutch 22. At this time, the recesses 27 and 28 do not register with each other and are displaced as shown in FIG. 3, so that the actuator roller 30 of the microswitch 29 is maintained in sliding contact with the outer peripheral surfaces of the two cam plates 19 and 21 without dropping into the recess 27 and 28. Accordingly, the parallel circuit of relay RA and alternating current motor 24 of low rate of rotation remains closed in FIG. 4. Since the relay RA is energized, the relay contact RA-1 is closed and the circuits 31 and 32 are both closed. Thus, the light source section 7, drive motor 13 and cooling fan 15 remain operative because power is supplied to them.

Now, if the endless belt 1 stops rotating for any one of the reasons stated at the beginning of this specification, the guide roller 3 will accordingly stop rotating. In such event, the second cam plate 21 will not rotate together with the first cam plate 19 in slaved relation, so that the second cam plate 21 is driven by the alternating current motor 24 of low rate of rotation through the one-way clutch 22. This brings the slot 26 in the second cam plate 21 to the broken line position shown in FIG. 3, causing a change in the relative positions of the two cam plates 19 and 21. Thus, the recesses 27 and 28 on the outer peripheries of the first and second cam plates 19 and 21 respectively are brought into index with each other. In this state, the first cam plate 19 is moved by the second cam plate 21 in slaved relation through the slot 26 and pin 25 arrangement, with the first cam plate 19 sliding through the one-way clutch 20 with respect to the coupling 18. The actuator roller 30a of the microswitch 29 drops into the recesses 27 and 28 disposed in superposed relation when these recesses reach the actuator, thereby bringing the microswitch 29 to the position shown in broken lines in FIG. 4. This opens the parallel circuit of relay RA and alternating current motor 24, with the result that the relay contact RA-1 opens and thus the two circuits 31 and 32 are both opened. Since the microswitch 29 is in the state shown in broken lines, however, the circuit 32 is closed again, permitting the cooling fan 15 alone to continue in operation and rendering the light source section 7 and drive motor 13 for the endless belt inoperative by shutting off the supply of power thereto.

From the foregoing description, it will be appreciated that the present invention is operative to automatically shut off the light source section and belt drive section as soon as the endless belt inadvertently stops in its travel for some reason and permits only the cooling section to remain operative, so that it is possible to avoid the danger of the copy sheets and endless belt catching fire in the copying machine.

While this invention has been described as being incorporated in an ammonia process diazo copying machine, it is to be understood that the invention is not limited to this application alone, and that the invention can have application in many other types of copying machines. Also, the present invention has been described as mounting the detection means on the guide roller 3, but it is to be understood that the detection means according to this invention may be mounted on any one of the guide rollers 4, 5 and 6. It is also possible to increase the rate of rotation of the guide roller or to connect the coupling 18 to a shaft which has a higher rate of rotation than the shaft of the guide roller thus permitting an increase in the rate of rotation of the alternating current motor 24, in order that the time interval between the stopping of rotation of the endless belt 1 and the actuation of the microswitch 29 can be made short.

What we claim is:

1. In a copying machine of the type having a printing light source, an endless belt for feeding said copy sheets to said light source, guide rollers for mounting said belt and rotatable thereby, and means for driving said belt at a given rate in normal operation, wherein the improvement comprises means for detecting the slippage or stoppage of the endless belt comprising:
    a. a first cam plate operatively coupled to one of the guide rollers for the endless belt for rotation therewith;
    b. a motor having an output shaft whose revolution rate is lower than the revolution rate of said guide roller in normal operation;
    c. a second cam plate operatively coupled to said output shaft for rotation therewith;
    d. means coupling said first and second cam plates for rotation together in two respective positions relative to each other, a first relative position when the revolution rate of said guide roller is greater than that of said output shaft and a second relative position when the revolution rate of said guide roller is reduced below that of said motor output shaft;
    e. a one-way clutch means connecting said second cam plate to said output shaft, said clutch being disengaged when said cam plates are rotating in the first relative position and being engaged when said cam plates are rotating in the second relative position; and
    f. means for producing a detection signal when said first and second cam plates are rotating together in the second relative position.

2. A detection means as in claim 1 comprising control means actuated by said detection signal for shutting off the belt drive means and the printing light source.

3. Apparatus as in claim 1 comprising:
    g. a one-way clutch means for connecting said first cam plate to the guide roller and engageable to rotate said first and second cam plates together in the first relative position when the revolution rate of said guide roller is greater than that of said output shaft.

4. A detection means as in claim 1 comprising a pin on one of said cam plates which projects toward the other cam plate, an arcuate slot in the other cam plate for receiving therein said pin, the engagement of said pin with the opposite ends of said slot respectively determining the two relative positions of the cam plates during rotation, and each cam plate having a recess formed at its outer periphery, said recesses being out of register with each other when the cam plates are in said first relative position during rotation and indexed with each other when the cam plates are in said second relative position during rotation, and switch means having an actuator riding on the outer periphery of said rotating cam plates which drops into the recesses when indexed to give a signal.

5. Apparatus for detecting when the rotating rate of a rotating element goes outside a selected rate limit comprising:

a. first means operatively coupled to the rotating element for rotation therewith in accordance with its rate of rotation;
b. a motor having an output shaft which rotates at a rate indicative of the selected rate limit;
c. second means operatively coupled to said output shaft for rotation therewith;
d. a one-way clutch means for coupling said second means to said output shaft;
e. means for coupling said first and second means for rotation together as a unit, said coupling means having a first condition wherein said first means drives said unit when said first means is rotating at a rate inside said selected rate limit and a second condition wherein said clutch means becomes engaged to drive said unit when said first means rotates at a rate outside said selected rate limit;
f. respective third and fourth means, on said first and second means, which cooperate when said unit is being driven through said clutch; and
g. means for detecting the cooperation of said third and fourth means and producing a signal indicating that the rate of rotation of the rotating element is outside said rate limit.

6. Apparatus as in claim 5 wherein said detecting means comprises switch means for controlling said motor.

7. Apparatus as in claim 5 wherein said first and second means comprise juxtaposed cam plates.

8. Apparatus as in claim 7 wherein said third and fourth means comprise recesses in the peripheries of said cam plates.

9. Apparatus as in claim 5 wherein said coupling means comprises a pin on one of said first and second means and a slot accommodating said pin in the other of said first and second means.

10. Apparatus as in claim 5 comprising:
h. a one-way clutch means for connecting said first means to the rotating element and engageable to drive said unit when said first means is rotating at a rate inside said selected rate limit.

* * * * *